United States Patent
Hartrell et al.

(10) Patent No.: US 7,913,292 B2
(45) Date of Patent: Mar. 22, 2011

(54) IDENTIFICATION AND VISUALIZATION OF TRUSTED USER INTERFACE OBJECTS

(75) Inventors: Gregory D. Hartrell, Sammamish, WA (US); David J. Steeves, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/550,554

(22) Filed: Oct. 18, 2006

(65) Prior Publication Data

US 2008/0098229 A1    Apr. 24, 2008

(51) Int. Cl.
*G06F 7/04* (2006.01)
*G06F 11/30* (2006.01)
*G08B 23/00* (2006.01)

(52) U.S. Cl. ......... 726/2; 726/3; 726/4; 726/16; 726/17; 726/22; 726/23; 726/24; 726/25; 726/26; 713/155; 713/161; 713/165; 713/167; 713/170; 713/176; 713/177; 713/179; 713/181; 713/187; 707/687; 707/697; 707/698; 707/699

(58) Field of Classification Search .......... 713/176–181, 713/151–168, 170, 187–189, 193; 726/22–26, 726/2–4, 16–17; 707/687, 697–699
See application file for complete search history.

(56) References Cited

U.S. PATENT DOCUMENTS

| | | | |
|---|---|---|---|
| 5,384,910 A * | 1/1995 | Torres | 715/810 |
| 6,065,057 A | 5/2000 | Rosen et al. | |
| 6,092,194 A * | 7/2000 | Touboul | 726/24 |
| 6,748,538 B1 * | 6/2004 | Chan et al. | 726/26 |
| 6,802,006 B1 * | 10/2004 | Bodrov | 713/187 |
| 7,076,655 B2 | 7/2006 | Griffin et al. | |
| 7,603,699 B2 * | 10/2009 | Abdulhayoglu | 726/2 |
| 2004/0034791 A1 * | 2/2004 | Savathphoune | 713/200 |
| 2005/0091486 A1 * | 4/2005 | Avraham et al. | 713/162 |
| 2005/0125661 A1 | 6/2005 | Vaidyanathan | |
| 2005/0166064 A1 | 7/2005 | Dive-Reclus et al. | |
| 2005/0219255 A1 * | 10/2005 | Lin et al. | 345/582 |
| 2005/0234680 A1 * | 10/2005 | Dettinger et al. | 702/182 |
| 2005/0275661 A1 | 12/2005 | Cihula et al. | |

(Continued)

FOREIGN PATENT DOCUMENTS

CN    1767434 A    5/2006

(Continued)

OTHER PUBLICATIONS

Trusted Paths for Browsers by Ye et al; Date: May 2005; Publisher: ACM transactions.*

(Continued)

*Primary Examiner* — Taghi T Arani
*Assistant Examiner* — Madhuri Herzog
(74) *Attorney, Agent, or Firm* — Turocy & Watson, LLP

(57) ABSTRACT

A unique system and method that facilitates visually identifying authentic UI objects, bundles, or windows is provided. A detection component can detect when user-based input has activated a verification mode with respect to one or more trusted UI objects rendered on-screen. A verification component can verify at least one of a source and identity associated with one or more UI objects in order to ensure the integrity related therewith. A verification rendering engine can re-render the one or more trusted UI objects in a manner that is based at least upon whether the one or more trusted UI objects are verified, thus improving visual recognition of verified trusted UI objects over non-verified UI objects.

19 Claims, 14 Drawing Sheets

U.S. PATENT DOCUMENTS

| | | | |
|---|---|---|---|
| 2005/0289353 | A1 | 12/2005 | Dahlke et al. |
| 2006/0026284 | A1 | 2/2006 | Nguyen |
| 2006/0136910 | A1 | 6/2006 | Brickell et al. |
| 2006/0225127 | A1* | 10/2006 | Roberts et al. ............... 726/2 |
| 2006/0259767 | A1* | 11/2006 | Mansz et al. ............... 713/168 |
| 2007/0244761 | A1* | 10/2007 | Scipioni et al. ............ 705/18 |

FOREIGN PATENT DOCUMENTS

| | | |
|---|---|---|
| GB | 2421093 | 7/2004 |
| WO | 0073913 | 12/2000 |
| WO | 0073913 A1 | 12/2000 |

OTHER PUBLICATIONS

International Search Report and Written Opinion dated and mailed Mar. 10, 2008 for PCT Application US2007/080650, 5 pages.

Carroll, et al. "Microsoft Palladium: A Business Overview" (2000) Microsoft Content Security Business Unit, 13 pages.

Mourad, et al. "WebGuard: A System for Web Content Protection" (2001) IBM White Paper, 2 pages.

Gomathisankaran, et al. "TIVA: Trusted Integrity Verification Architechture" (2005) Proceedings of DRMITICS, 13 pages.

Chinese OA, mailing date Oct. 12, 2010, for Chinese Patent Application No. 200780039140.8, 14 pages.

* cited by examiner

EXAMPLES OF VISUAL TRANSFORMS:
- ADDITION OF COLORED BORDER AROUND AUTHENTIC WINDOW
- ADDITION OF SURFACE TEXTURE (DOTS OR BUMPS) OVERLAY ON AUTHENTIC WINDOW

IDENTIFICATION AND VISUALIZATION OF TRUSTED USER INTERFACE OBJECTS

BACKGROUND

Computing devices have become an integral aspect in the daily lives and operations of consumers and businesses. Although they significantly contribute to greater efficiencies and conveniences for most users, they are also vulnerable to various attacks and fraudulent uses. For example, a company may require their employees to login into their computers or into particular applications in order to protect highly sensitive and confidential information. When conducting business online, users may desire to protect their credit card information and other personally identifiable information. In either scenario, it can be difficult for users to discern a fake user interface (UI) element in a graphical operating system from a legitimate one. This is primarily because graphical objects are easily forged to look legitimate. Thus, when a user is prompted with a dialog box requesting the user's account number, username, password, and/or payment information, the actual source of the dialog may be a malicious site, software, spam, or other fraudulent entity.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to systems and/or methods that facilitate readily distinguishing legitimate user interface objects from their false counterparts in a secure manner. In particular, the systems and methods involve verifying the identities of one or more UI objects which have been rendered on a display and then modifying the appearance of the authentic UI objects. As a result, a user can readily recognize and discern authentic UI objects from those which have not been authorized.

This can be accomplished in part by cryptographically signing trusted graphical UI (GUI) objects and storing them locally and/or remotely. When a user performs an action that requires one or a collection of UI objects (e.g., to generate a window or dialog box) to be rendered, the necessary UI objects can be retrieved from the appropriate trusted GUI object stores and then rendered accordingly.

Before entering or communicating sensitive information by way of interacting with the rendered UI objects, the user can perform some type of discoverable action. When such action is detected, verification of the rendered UI objects can be triggered in order to confirm the origin or source of them. Verification can occur by employing at least two different techniques. In the first, a cryptographic hash of the rendered UI objects can be calculated or communicated in order to verify that this hash was originally stored in at least one of the trusted GUI stores. In the second, the UI objects which are a part of the window or dialog box can be verified as a collection rather than as individual UI objects.

When the verification is successful, the appearance of the verified UI objects can be altered by applying one or more visual transforms or lack thereof applying a visual transform to the individual UI objects or to the window as a whole. In other words, the visual transform can be implemented to identify a non-authentic dialog or an authentic dialog. For instance, the window can be re-rendered with a colored border surrounding its perimeter. Verified UI objects can also be rendered using different textures or images in order to alter the surface of the objects. Similarly, when the verification is unsuccessful, the affected UI objects can be re-rendered to appear faded out, transparent, or otherwise de-emphasized compared to the verified UI objects that may also be present. In the alternative, verified UI objects can be rendered without change while any non-verified UI objects can disappear from view. The rendering location for verified UI objects can also be specified. For example, any verified window can be rendered in the top left corner of the screen or even on a different screen.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
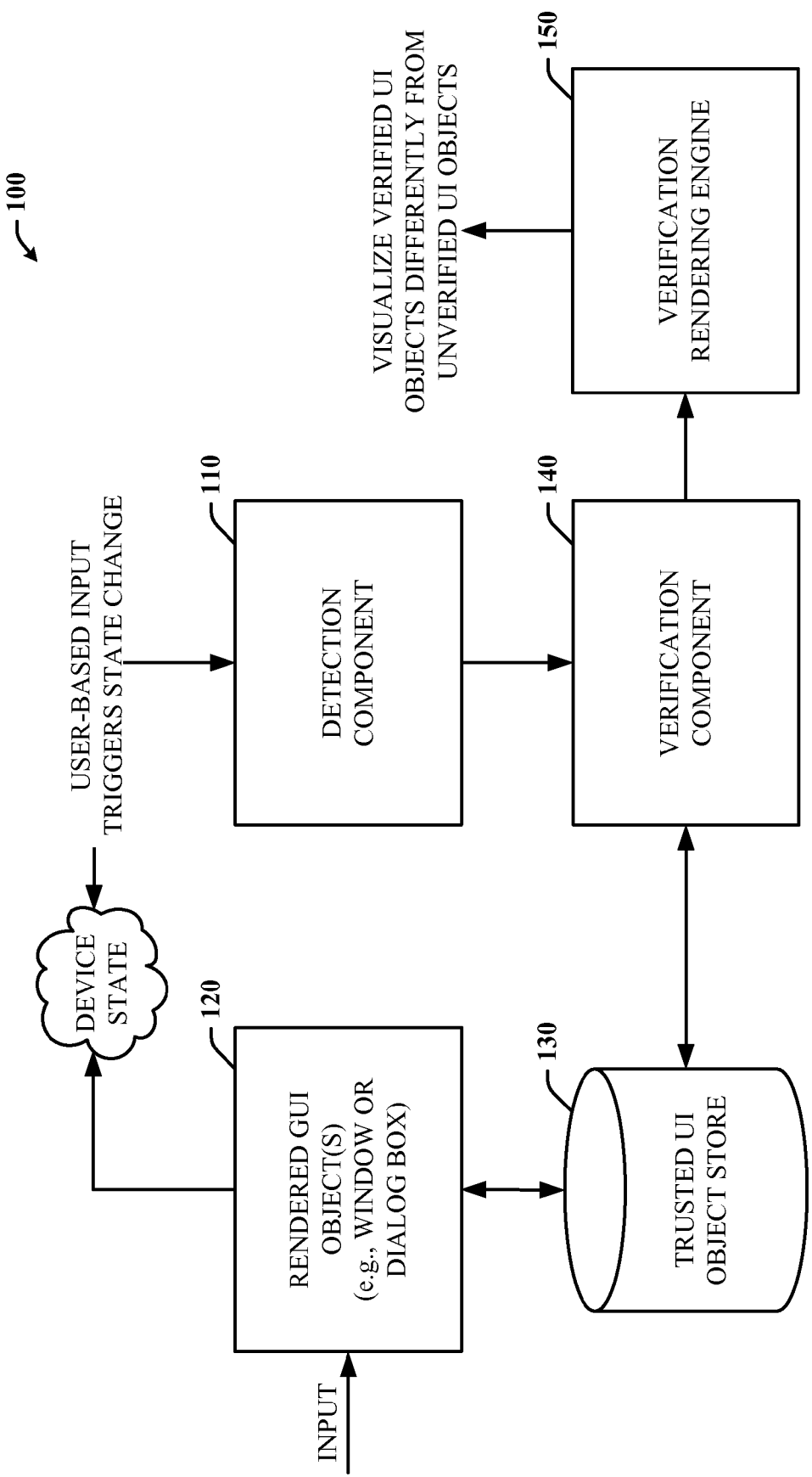
FIG. 1 is a block diagram of a verification system that facilitates the identification of authentic UI objects when rendered on-screen.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The term v Window as used herein is intended to refer to a GUI element (UI object) whose rendering objects (e.g., controls, frames, etc.) have been digitally signed or encrypted and can be verified independently. A v Window otherwise visually resembles any other window that is rendered to the user. Thus, the terms "trusted window" and "v Window" can be and are used interchangeably throughout the description below. However, a verified v Window indicates that the v Window has gone through the verification process successfully and a non-verified v Window has failed verification or has not been subjected thereto. A v Window can include a subset of UI objects or a UI bundle which can be selectively verified. Furthermore, any GUI element can be verified as described herein and is not limited to just a window or dialog. Buttons, toolbars, or a plug-in for a GUI (e.g., gadget) can be verified in a similar manner as well. Moreover, it is to be appreciated that a window can refer to a "trusted window" and that a window can be a collection of GUI objects.

Referring now to FIG. 1, there is a general block diagram of a verification system 100 that facilitates the identification of authentic UI objects when rendered on-screen. The system 100 includes a detection component 110 that can monitor a device state and detect a change in the state of the device. The device can be any computing device such as a laptop, PDA, tablet PC, and a desktop PC. In practice, imagine that a user's interaction with an application or web page causes a window or dialog box to appear that involves confirmation of credentials, critical prompts, or other decisions. The window, for example, can be composed of one or more trusted UI objects 120 that have been retrieved from a trusted UI object store 130 and rendered on the device's screen. Prior to entering any information or clicking on any of the UI objects (e.g., buttons) presented in the window, the user can verify that the window, or rather the rendered UI objects included therein, are in fact legitimate and from the trusted UI object store 130.

A verification mode can be triggered by the user which causes a state change on the user's device. The detection component 110 can detect the change and in particular, that the verification mode has been activated. During verification, a verification component 140 can confirm the source or authenticity of at least a subset of the rendered UI objects, thus mitigating the transmission of sensitive information to fraudulent applications or websites. Verification can be performed in at least two different ways. In the first, a cryptographic hash can be calculated or passed for each rendered UI object or UI bundle. The verification component 140 can verify that this hash is the one that was originally stored in the trusted UI object store 130. It is to be appreciated that any suitable hash verification technique can be implemented such as, but not limited to, digital signatures, direct string comparison, HMACS, etc. In the second, the UI objects utilized to render the window can be verified as a collection, rather than individually. Here again, the verification component 140 can determine a cryptographic hash on the collection and then compare the hash to the one found in the trusted UI object store 130.

When the verification succeeds, a verification rendering engine 150 can visually modify the appearance of the verified window or UI objects. Such visual modifications can include but are not limited to rendering the verified UI objects in a different color and/or with a different surface texture or image (e.g., watermark). The verified window or set of verified UI objects can also be rendered on the same display but at a specific location on the display or on a separate display (e.g. secondary screen/monitor) operatively connected to the device. The device's display screen can also be segmented into distinct display areas (e.g., inset view or picture-in-picture) whereby each display area is controlled by a separate operating system or processor. In this case, the verified window or UI objects can be rendered in the inset view. By rendering the verified UI objects in any of the above ways, the user can readily distinguish between legitimate UI objects associated with a trusted source or application and fake UI objects that have been rendered by an unknown or unauthorized application and intended to look like their legitimate counterparts. It is to be appreciated that the verification rendering engine can provide visual modification to the appearance of a non-verified window or UI object. In other words, the system 100 can provide identification via visual modification to identify verified windows, UI objects or to identify non-authentic windows, UI objects. Furthermore, it is to be appreciated and understood that the visualization techniques (e.g., transformation techniques, etc.) can be any suitable techniques that can identify an authentic and/or non-authentic window and/or UI object to a user/machine. For instance, the transforms can be applied directly to texture surfaces, modifying the images directly, etc.

Figure 2:
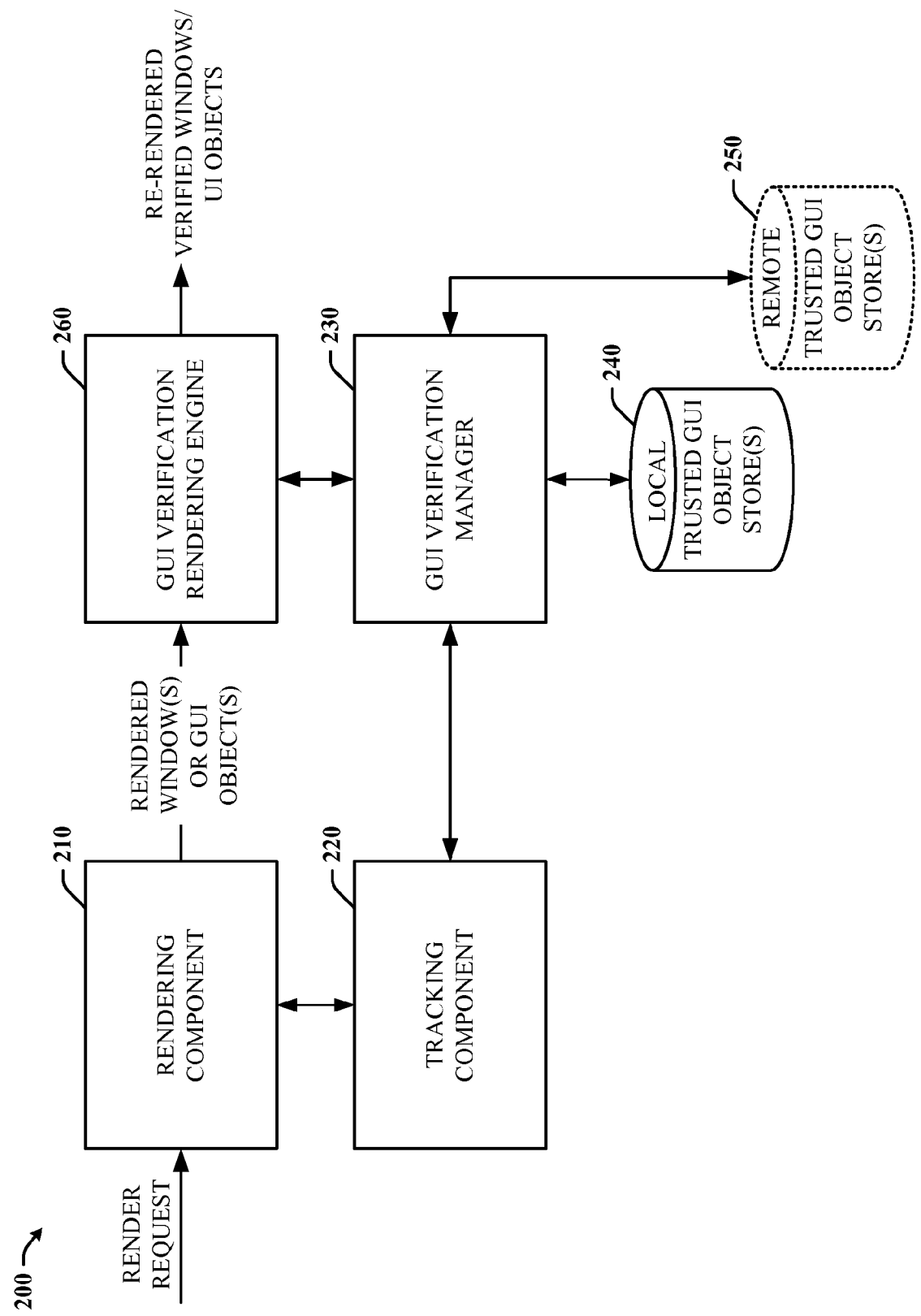
FIG. 2 is a block diagram of a verification system that facilitates rendering authentic UI objects, validating the identities of such objects, and modifying the appearance of such authentic UI when their identities have been validated.

Turning now to FIG. 2, there is a block diagram of a verification system 200 that facilitates rendering trusted UI objects, validating the identities of such objects, and modifying the appearance of such authentic UI when their identities have been validated. The system 200 includes a rendering component 210 that initially receives and processes a render request. For example, a user interacts with an application and such interaction requires the rendering of a window containing a plurality of GUI (graphical user interface) or UI objects. The render request is generated and can be communicated to a tracking component 220 which interfaces with a GUI verification manager 230. The GUI verification manager 230 retrieves the UI objects that are necessary in order to properly render the window from one or more trusted UI object stores.

The trusted UI object stores can be located on a local system (240) and/or on a remote system 250 (e.g. web server). It should be appreciated that the UI object stores comprise digitally signed or encrypted UI objects or object bundles which have been independently authorized and verified. Digital signing of the objects can occur on compilation or distribution of an operating system and its components. For example, a trusted GUI bundle may be a programmatic collection of encrypted objects or a digitally signed hash of all the objects needed to render a particular trusted window. Because the combination of UI objects needed to create or render nearly any window is not likely to change between users, such UI objects can be secured and stored locally and/or remotely (e.g. disk, other hardware, server). Moreover, the claimed subject matter can include any suitable technique and/or manner for independent verification and/or authentication such as, but not limited to, digital signatures, encryption, watermarks, a steganography transformation, etc.

Once the appropriate UI objects are retrieved from the respective UI object stores, the GUI verification component 230 can verify that each object or bundle has not been tampered with. Thus, an encrypted bundle can be returned to the rendering component 210. The tracking component 220 maintains an internal tracking table of all or substantially all rendered (trusted) UI objects or bundles which have been requested for rendering. However, if the rendering component 210 fails to render the particular bundle of UI objects, then the entry for the bundle or window can be removed from the table.

When the trusted bundle of UI objects is communicated back to the rendering component 210, the rendering component 210 can render the trusted bundle or window on the appropriate screen for the user. Now imagine that the user wants to verify that this window is in fact legitimate before submitting personal information or before clicking a button or submitting any other information. To do so, the user provides some type of user-based input that is discoverable by the system 200 in order to trigger the verification process. The user-based input can include, but is not limited to, a keystroke or secure attention sequence, a mouse-click on a designated location on the device screen, a hand or finger gesture detected by an integrated camera or other sensor, verbal commands, eye movement, and/or any other type of physical movement made by the user that is discoverable and can be translated and used to cause a state change in the current operating mode of the user's desktop.

For example, imagine that the user performs a secure attention sequence such as a control-alt-delete keystroke sequence. This can trigger the current desktop state to enter a verification mode which initiates the verification process. A GUI verification rendering engine 260 can detect this state change and can process the verification request. The GUI verification rendering engine 260 can be considered to be a user mode component of the operating system (OS). When the verification process is initiated, the GUI verification rendering engine 260 can enumerate all of the currently rendered windows and sort which windows according to whether they are tagged as trusted windows. For each trusted window (e.g., v Window), the GUI verification rendering engine 260 makes a request to the GUI verification manager 230 to verify that each trusted window is really a trusted window and not a fake. This can be accomplished in part by calculating or passing a cryptographic hash of all the objects that are currently rendered. The GUI verification manager 230 can verify that this hash is the one was originally stored in at least one of the trusted GUI object stores (240, 250).

When the trusted window is verified to be legitimate, the GUI verification rendering engine 260 can perform one or more visual transforms on the verified (trusted) windows or UI objects. For example, the color of the verified window can be changed to a specific color. The parameters for the one or more transforms can be communicated to the appropriate rendering components or subcomponents in order to render the verified windows differently from the non-verified windows. In some cases or where preferred, only verified windows can be displayed, thus removing any non-verified windows from the screen.

The visual transform as applied to the verified window or UI objects can last in a permanent state until the user performs some designated action or otherwise interacts with the desktop. Alternatively, the transform can be temporary and disappear after a period of time has elapsed (e.g., according to a pre-set timer).

In addition to affecting the general appearance or surface texture of the verified window, a visual transform can also include rendering the verified window on another external display. For instance, the user can specify an external display to only display verified windows.

Verification can occur through an existing trusted UI such as an isolated desktop acting as the verification mode desktop. Similarly, the user can be presented with a different desktop that only renders verified trusted windows (or verified v Windows). In this case, a separate input method can be required to interact with these UI objects. Hence, the GUI interaction by the user can be proxied back into the original desktop through another component that interacts with the operating system and the GUI. Otherwise, verification can take place through an external UI such as on a PDA (personal digital assistant) attached to the user's computer.

Figure 3:
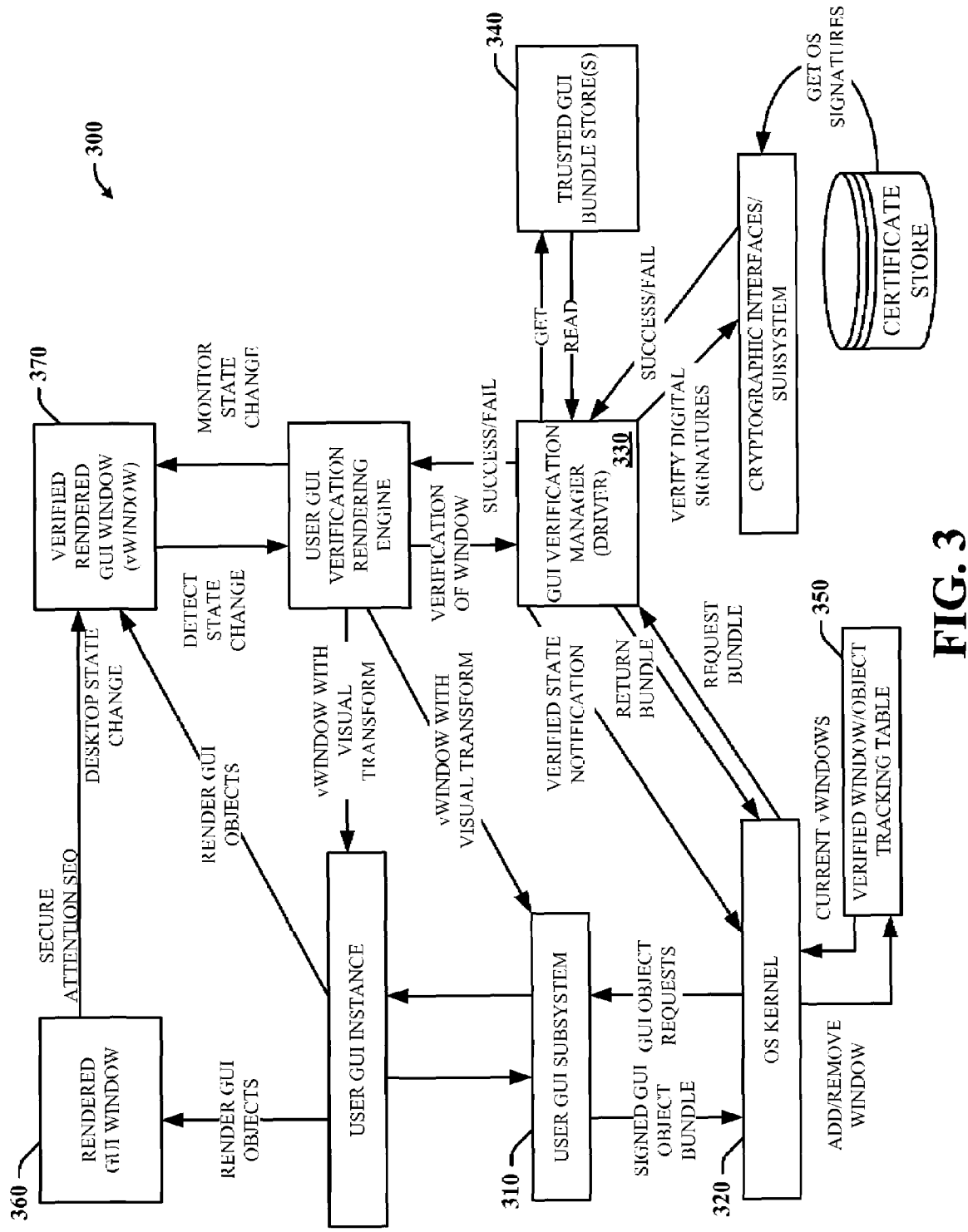
FIG. 3 is a block diagram of a verification system that facilitates verifying UI objects and rendering them differently to a user in order to readily distinguish between authentic UI objects and those that are rendered by other unknown applications.

FIG. 3 is a comprehensive block diagram of a verification system 300 that facilitates verifying UI objects and rendering them differently to a user in order to readily distinguish between authorized UI objects and those that are rendered by other unknown applications. The system 300 can perform at least two major operations: rendering trusted windows and verifying the identities of those trusted windows. In practice, for example, a user performs an action which requires a v Window or some other identifiable UI object to be rendered such as a credential dialog. A request to render this v Window can be generated and then filtered down through a User GUI subsystem 310 and into the OS kernel 320 (OS manager). The OS kernel 320 can recognize that the request is for a v Window and then request a specific bundle from the GUI verification manager 330. The GUI verification manager 330 retrieves the corresponding trusted GUI bundle for that v Window from one or more trusted GUI bundle stores 340. The OS kernel 320 returns an encrypted bundle to the User GUI subsystem and adds that v Window to its own internal tracking table 350 of all current v Windows that are being rendered. The GUI subsystem 310 passes this encrypted bundle to the appropriate user GUI instance (e.g., the calling instance) and the presumed v Window is rendered to the user (360). However, when the User GUI subsystem 310 fails to render the v Window, then its entry is removed from the tracking table 350.

When rendered to the user, the presumed v Window 360 generally appears indistinguishable from any other window that appears on-screen which makes it difficult to discern whether the source of the window is as it appears. To make this determination easier for the user, the user can activate a verification mode in which true v Windows are rendered in a visibly different manner than other windows. As discussed in FIGS. 1 and 2, supra, the GUI verification manager 330 can compare a cryptographic hash of the rendered v Window with those originally stored in the trusted UI bundle store 340. When a match is found or confirmed, the verification can be viewed as a success and the v Window can be visually modified to indicate that its identity has been verified and is legitimate (370).

Figure 4:
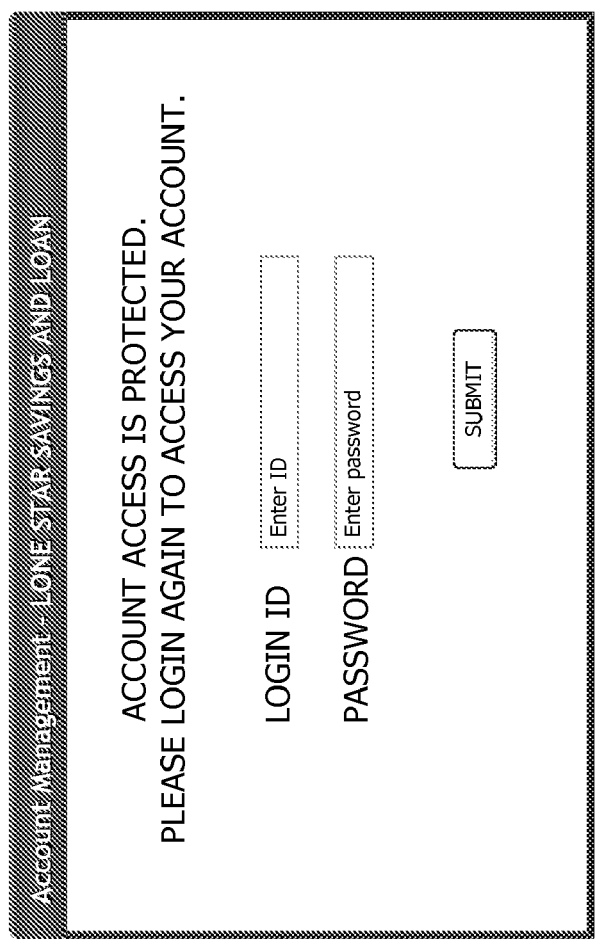
FIG. 4 is an exemplary user interface or window that includes one or more UI objects, the identities of which can be verified in order to determine their authenticity or source.
Figure 5:
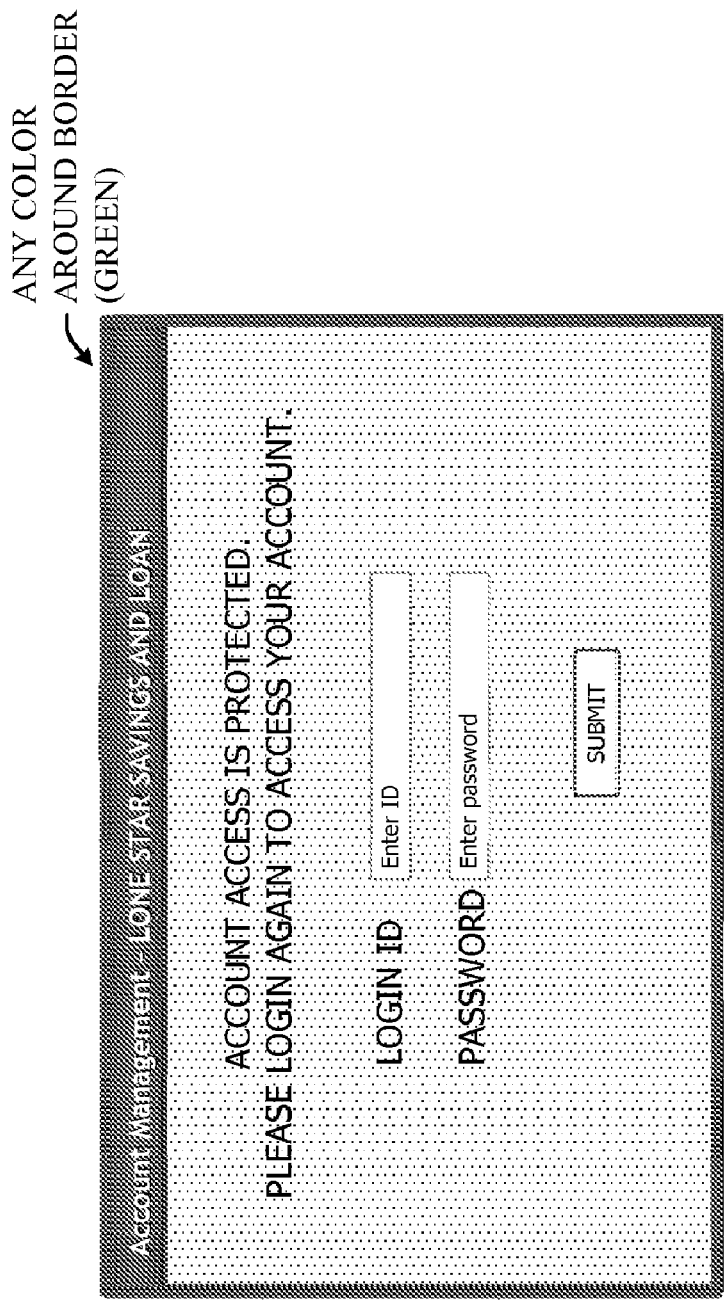
FIG. 5 is an exemplary user interface or window which has been rendered following verification of the UI objects and visually modified in order to readily identify verified and/or unverified UI objects.

The window in FIGS. 4 and 5 demonstrate various visual transforms that can be applied in order to readily distinguish a verified window from a non-verified window. More specifically, FIG. 4 illustrates an exemplary window 400 that includes one or more UI objects, the identities of which can be verified in order to determine their authenticity or source. Here, a user is prompted to enter sensitive information in order to access account information. Before entering such information, the user can verify the source of this window 400.

FIG. 5 illustrates the resulting window which has been rendered following verification of the UI objects. In particular, the window 400 from FIG. 4 has been visually modified by the addition of a green colored border around the edge of the window. It should be appreciated that any color border can be selected to the extent that it is readily apparent to the user. Alternatively or in addition, a texture or overlay can be applied to the window's surface. Here, a dotted or bumpy surface has been applied over the window surface. Once the user interacts with the verified window in some manner, the visual transform can disappear. Furthermore, it is to be appreciated and understood that the visualization techniques (e.g., transformation techniques, etc.) can be any suitable techniques that can identify an authentic and/or non-authentic window and/or UI object to a user/machine. For instance, the transforms can be applied directly to texture surfaces, modifying the images directly, etc.

Figure 6:
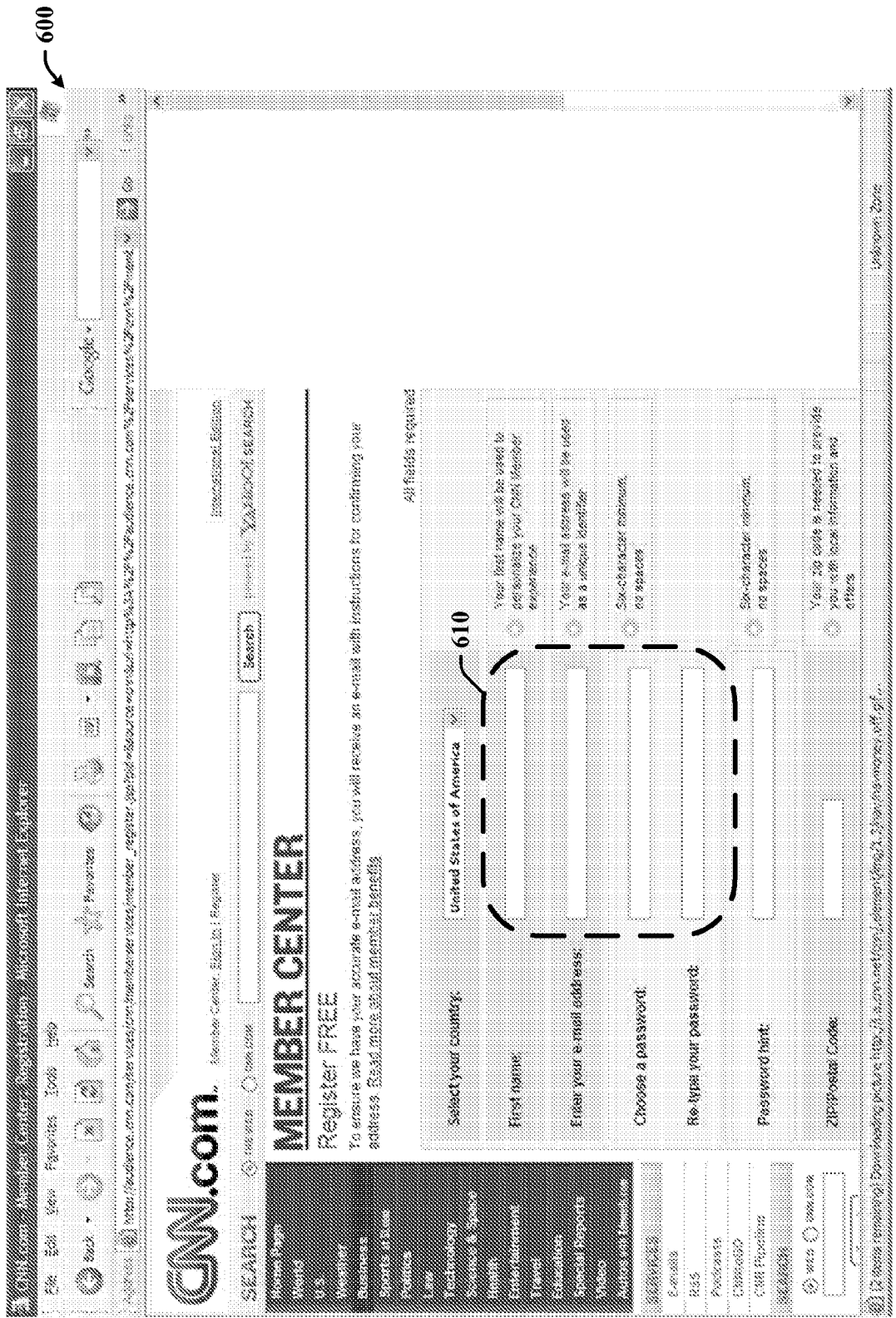
FIG. 6 is an exemplary user interface of a web page which includes a plurality of UI objects that have been rendered but have not been verified.

In some instances, the user may not want or need to verify an entire window and all the UI objects included therein. On such occasions, the user can select which UI objects or subwindows are desired for verification. In another example, the user interface can be part of the verification process (e.g., the selection of UI elements can live in a trusted remote workstation and not in the user's local workstation). FIG. 6 shows an exemplary user interface for a rendered web page window 600. As indicated by the dashed-in area 610, UI objects can undergo verification in a selective manner. The user can select which UI objects to verify or can be guided by an UI object analyzer (not shown) that evaluates the UI objects rendered in the window and determines which is likely to impact the user the greatest amount with respect to privacy or security concerns. Thereafter, the analyzer can suggest which UI objects to verify or can automatically select them.

Figure 7:
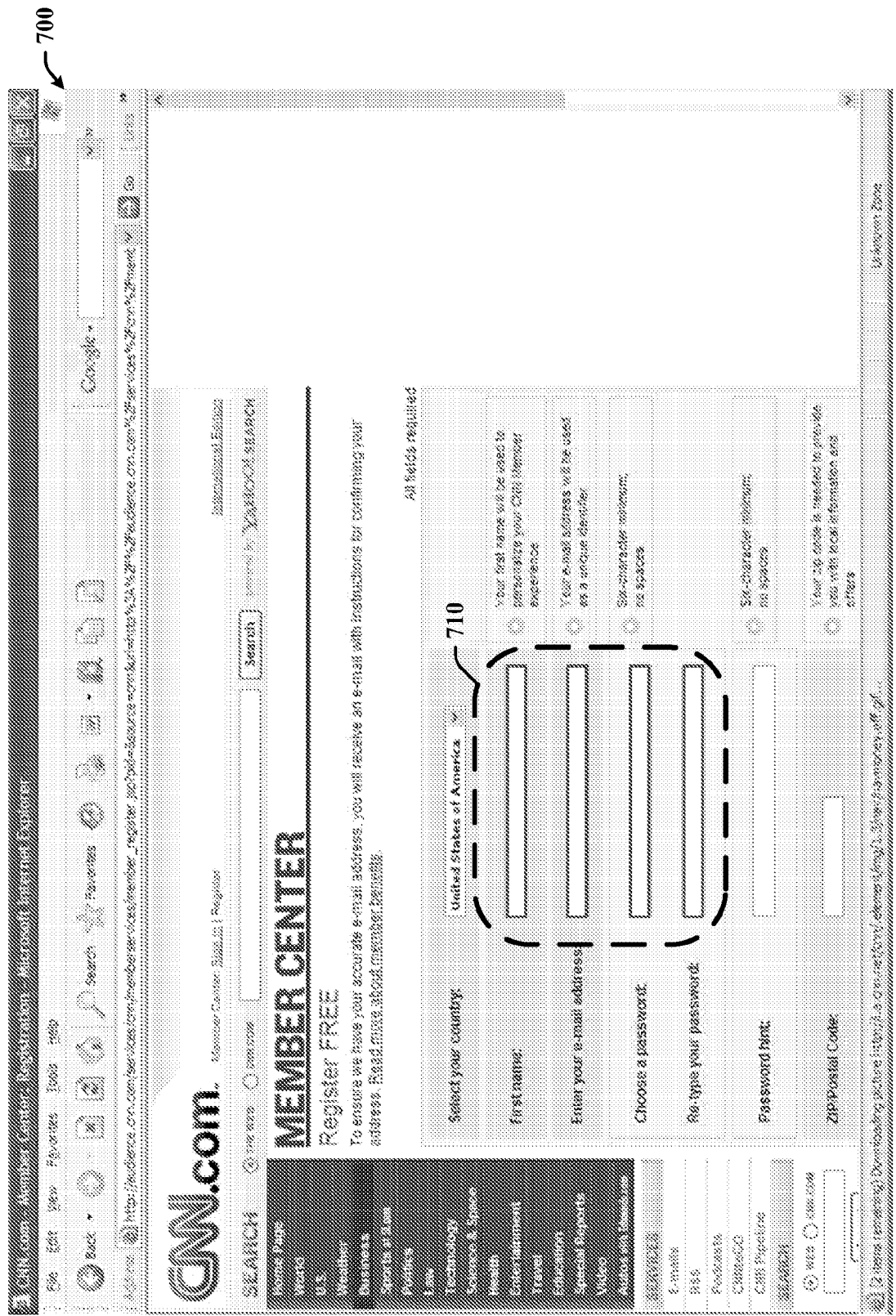
FIG. 7 follows from FIG. 6 and illustrates the web page in which the plurality of UI objects have been selectively verified for their authenticity.

Following from FIG. 6, FIG. 7 illustrates the resulting view of the web page 700 after the selected UI objects 710 have been verified. As can be seen, the affected UI objects have been visually modified through the use of color (e.g., color border around the selected UI objects) so that the user can readily recognize that the selected UI objects 710 have in fact been verified and can be considered trustworthy. The other portions of the web page remain unchanged and unaffected by the verification process. It should be appreciated that advertisements can be verified as well to mitigate clicking on links operated by spammers or other fraudulent companies.

Figure 8:
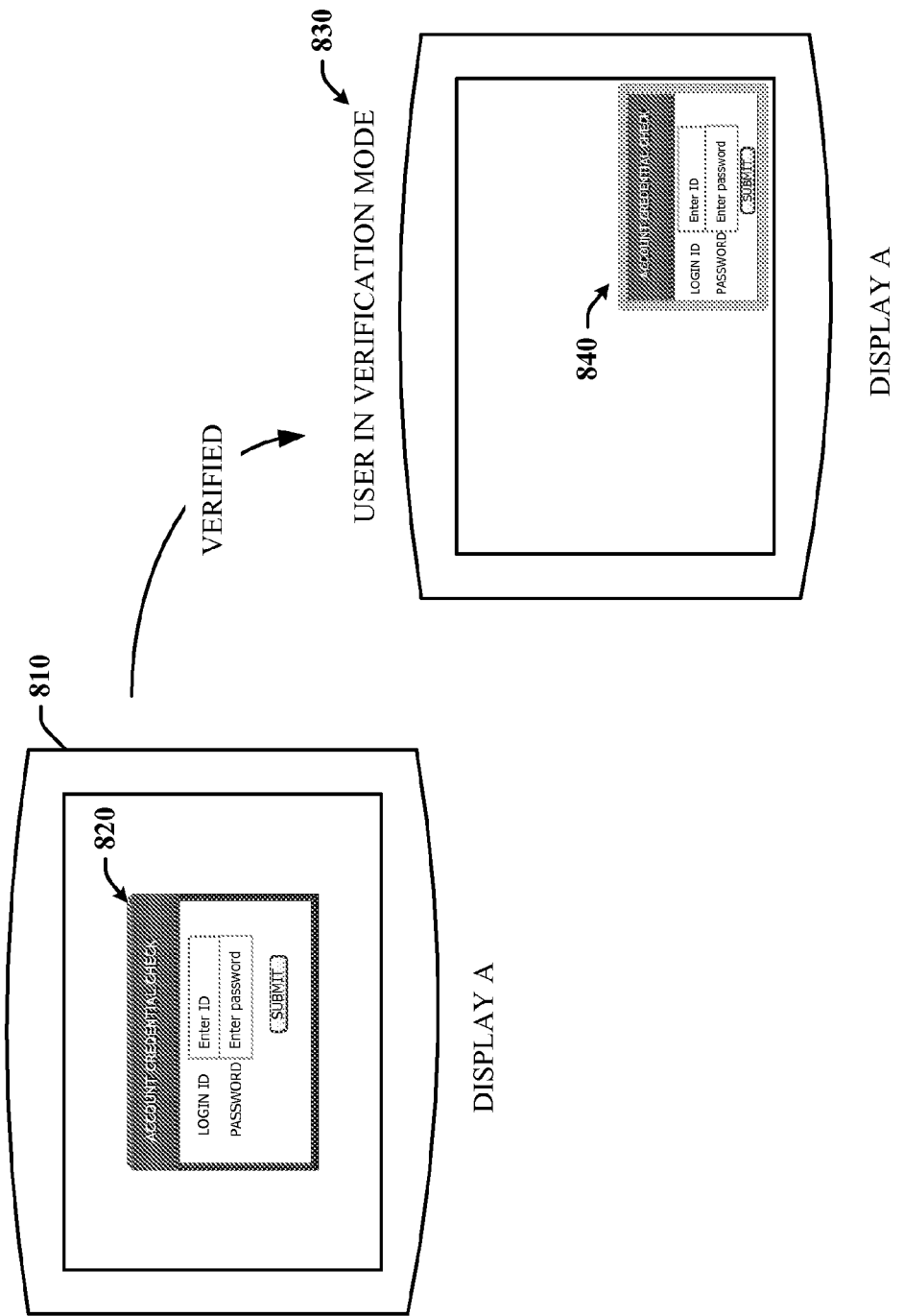
FIG. 8 demonstrates an exemplary application of visual transforms for UI objects which have been verified and authorized (e.g., authentic UI object presented in a specified location on the (same) screen).

Rendering and verification of rendered UI objects can be performed on a single operating system, wherein the verified UI objects can appear on a single display with or without any non-verified UI objects (e.g. FIG. 8, infra). Alternatively, dual operating systems can be employed to perform the rendering and verification. Dual displays can be utilized to correspond with each operating system. For example, a first operating system and display can be used for initially rendering UI objects and verifying their identities while a second operating system in communication with the first operating system can be utilized to render and interact with only verified UI objects (e.g., FIG. 9, infra).

Dual displays, however, are not required when using dual operating systems. In particular, a single display can be shared by dual operating systems, whereby one operating system controls a portion of the display and the other operating system controls the other portion of the display (e.g. picture-in-picture display). Imagine that verified UI objects can be viewed and/or interacted with using one designated half of the display and all other non-verified UI objects can be viewed and/or manipulated in the other half. It should be understood that examples of displays can include but are not limited to computing device screens, peripheral monitors/screens, television monitors, and the like. For instance, only verified windows can be visualized on an external UI display such as on the screen of a smartphone attached to the user's computing device.

Turning now to FIG. 8, there is demonstrated an exemplary application of visual transforms for UI objects which have been verified and authorized. In particular, Display A 810 initially presents an account credential check window 820 to a user. Before entering any of the requested information, the user can activate the verification mode 830 to verify the authenticity of the account credentials window 820. While still in verification mode, the verified account credential check window 840 can be presented to the user using one or more visual transforms that conspicuously indicate that the window has been verified. As shown in FIG. 8, the user can easily visualize that this window 840 has been verified. First, the account credential check window 840 has a color border around it; and second, the window 840 is presented at a specific location on Display A which has been designated for rendering verified UI objects or windows. If there were other non-verified UI objects present on-screen with the account credential check window 840, then they would appear as they were originally rendered. Alternatively, they can be removed entirely from the display or made to appear faded out or translucent relative to the verified window.

Figure 9:
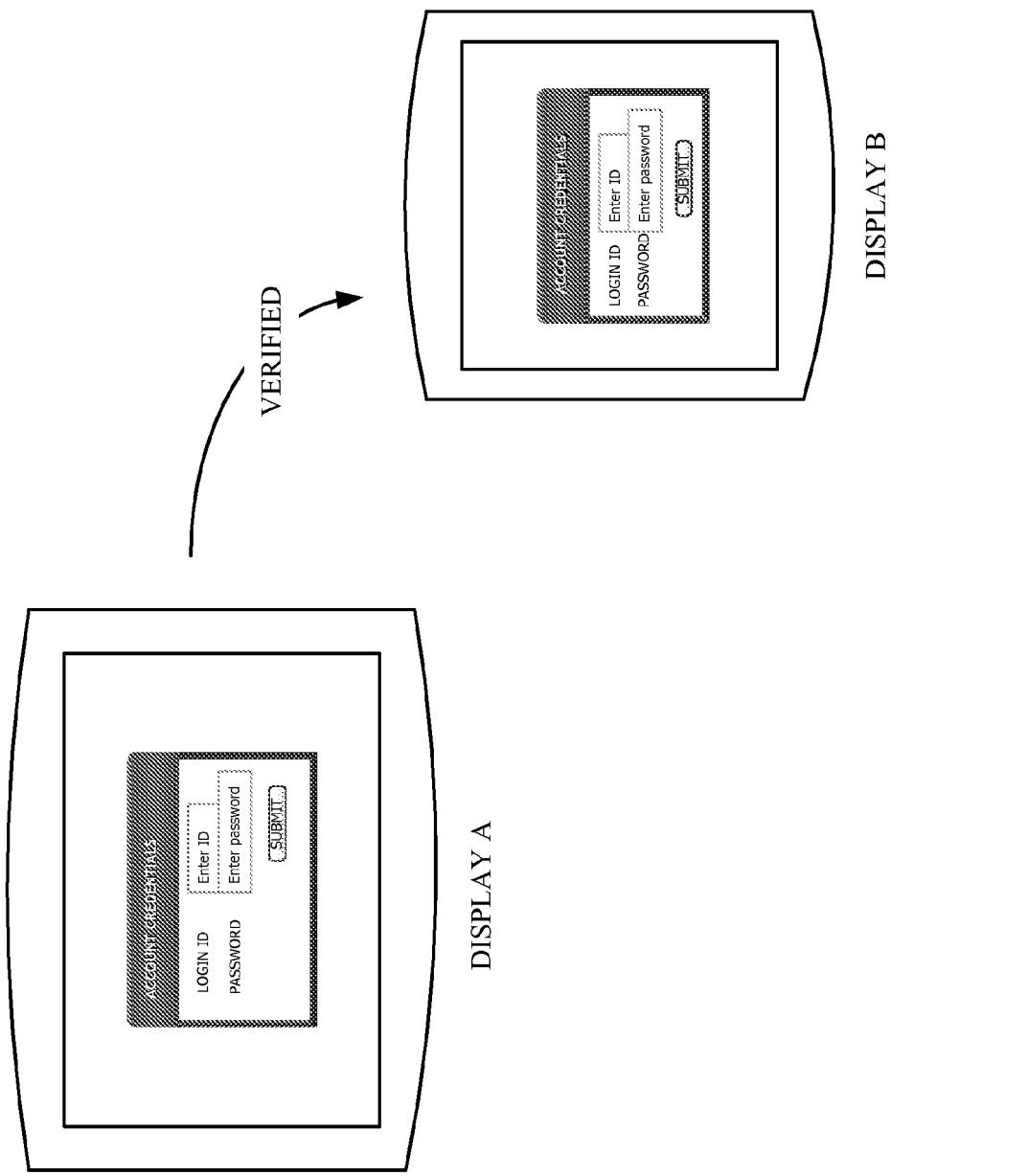
FIG. 9 demonstrates an exemplary application of visual transforms for UI objects which have been authorized (e.g., authentic UI objects presented on a separate screen).

Verified UI objects or windows can also be presented on a separate display as demonstrated in FIG. 9. After completion of the verification process, verified windows or verified UI objects can be rendered on a separate screen: Display B. Any non-verified windows or UI objects can remain visible on the display upon which they were originally rendered: Display A. In addition, all of the content originally rendered on Display A can remain the same. Under this set of circumstances, the separate screen can be employed solely for the purpose of informing the user that the selected window has been verified and that he can proceed with interacting with Display A content. Alternatively, a separate operating system and/or input mechanism can control the verified content shown on Display B. It should be understood that other visual transforms can be applied as well to the verified window—though not specifically illustrated in FIG. 9.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 10:
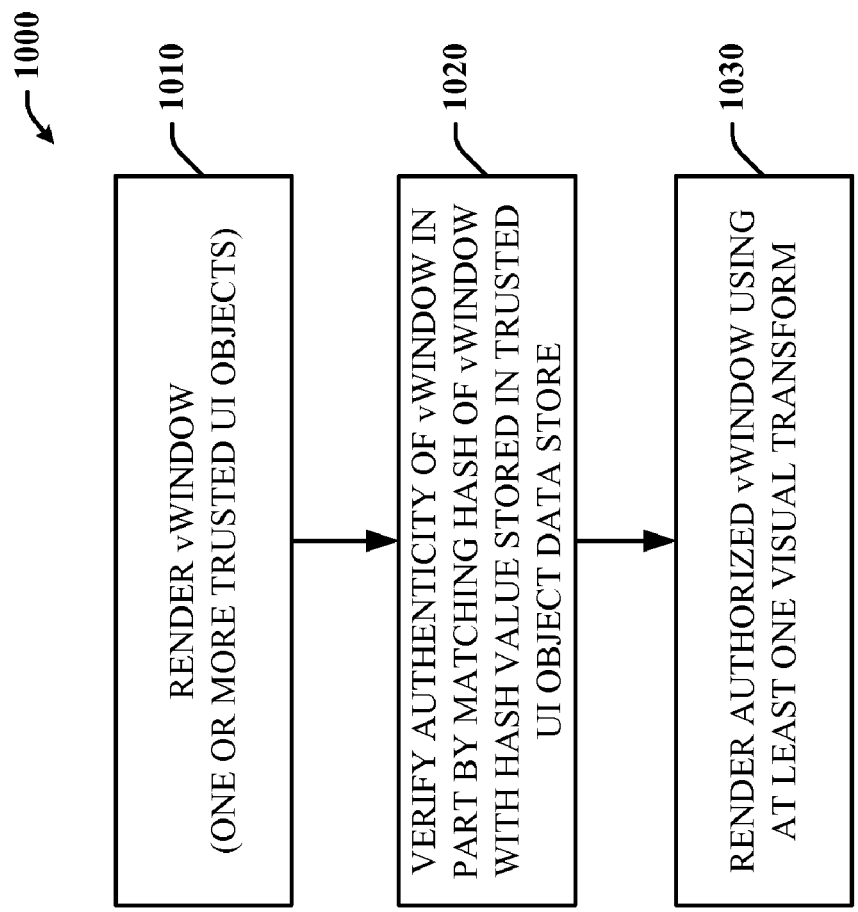
FIG. 10 is a flow diagram illustrating an exemplary method that facilitates the identification of authentic UI objects when rendered on-screen.

Referring now to FIG. 10, there is a flow diagram illustrating an exemplary method 1000 that facilitates the identification of authentic UI objects when rendered on-screen. The method 1000 involves rendering a v Window (or one or more trusted UI objects) at 1010. Though not indicated in the method 1000, the v Windows rendered at 1010 can be recorded into a tracking table for later reference.

At 1020, the authenticity of the v Window can be verified at least in part by matching a calculated hash of the v Window with hash values stored in a trusted UI object data store. The authorized v Window can be rendered using at least one visual transform at 1030. In some instances, verification can fail using the hash technique. When this occurs, the method 1000 can reference the tracking table to determine whether the v Window is listed. If a match is found, then the v Window can be authorized and visually altered accordingly. Though not shown in FIG. 10, the method 1000 can also track and maintain a record of authorized v Windows which are being rendered differently from other windows including other v Windows.

It should be appreciated that the management of v Windows as described hereinabove as well as in the method 1000 can take place within the operating system of the user's computing device or within some other central authority (e.g., signature authority). The central authority can manage v Windows, distribute them to operating system users, and verify them as requested.

Figure 11:
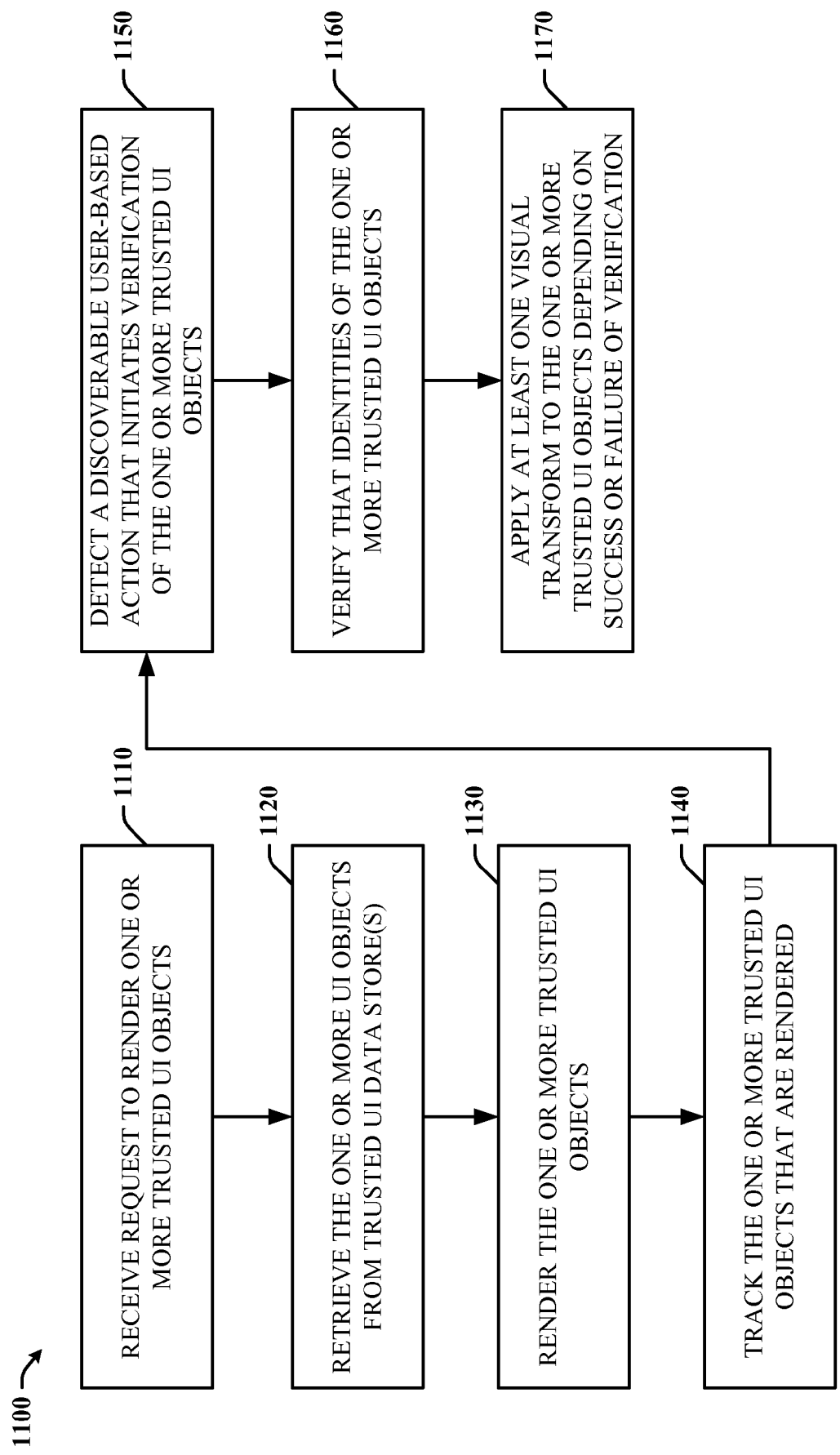
FIG. 11 is a flow diagram illustrating an exemplary method that facilitates rendering authentic UI objects, validating the identities of such objects, and modifying the appearance of such authentic UI objects when their identities have been validated.

Turning to FIG. 11, there is a flow diagram illustrating an exemplary method 1100 that facilitates rendering authentic UI objects, confirming that their identities are legitimate, and modifying the appearance of such authentic UI objects once their identities have been validated. The method 1100 involves receiving a request to render one or more trusted UI objects at 1110. At 1120, the one or more UI objects can be retrieved locally and/or remotely from at least one trusted UI object data store. The one or more trusted UI objects can then be rendered to the user at 1130. The one or more trusted UI objects which have been rendered at 1130 can also be logged into a table at 1140 in order to track which trusted UI objects have been rendered for a particular user.

At 1150, the method can detect a discoverable user-based action that initiates verification of the one or more UI trusted objects—which were rendered at 1130. The user can request verification of all or a subset of the rendered UI objects. At 1160, the identities or sources of the selected UI objects can be verified. Objects that are affirmatively verified or not verified can be re-rendered using one or more visual transforms at 1170. Examples of visual transforms include but are not limited to applying a border or colored border around the UI object (or window), modifying the texture of the surface of the window or UI object using an overlay, increasing the translucency of non-verified objects or removing them entirely from the display, highlighting the verified window or UI object, modifying dimensions of the object or window, etc. In addition, verified objects or windows can be rendered in specific locations of a designated display. The display can be the same display as used to initially render the trusted objects or windows or can be a separate, external display.

Figure 12:
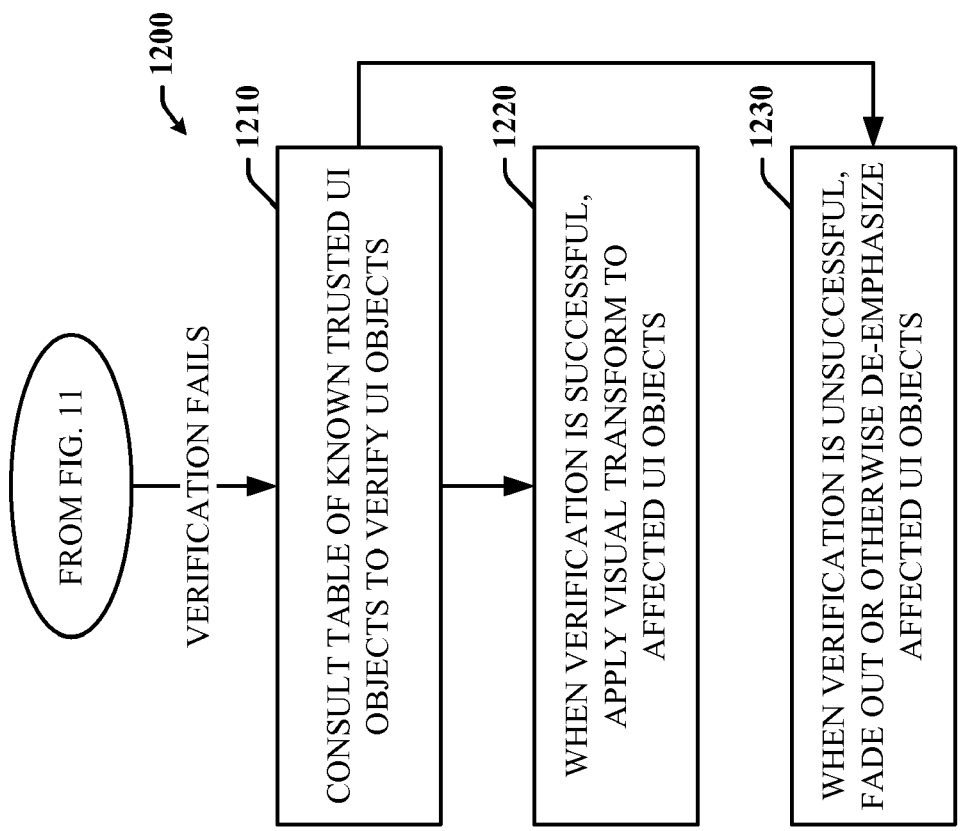
FIG. 12 is a flow diagram illustrating an exemplary method that provides for a course of action when verification fails.

When verification fails or when a v Window cannot be verified through the verification process, an exemplary method 1200 as presented in FIG. 12 provides a course of action. The method 1200 involves (at 1210) consulting with or referencing a tracking table of the trusted v Windows that have been rendered by the method 1100 at 1110, for example.

If there is a match, then the verification is successful and one or more visual transforms can be applied accordingly at 1220. However, when the verification remains unsuccessful, the non-verified v Window can be visually altered (e.g., faded out or otherwise de-emphasized) at 1230 so that the user is visually aware that the v Window could not be verified.

Figure 13:
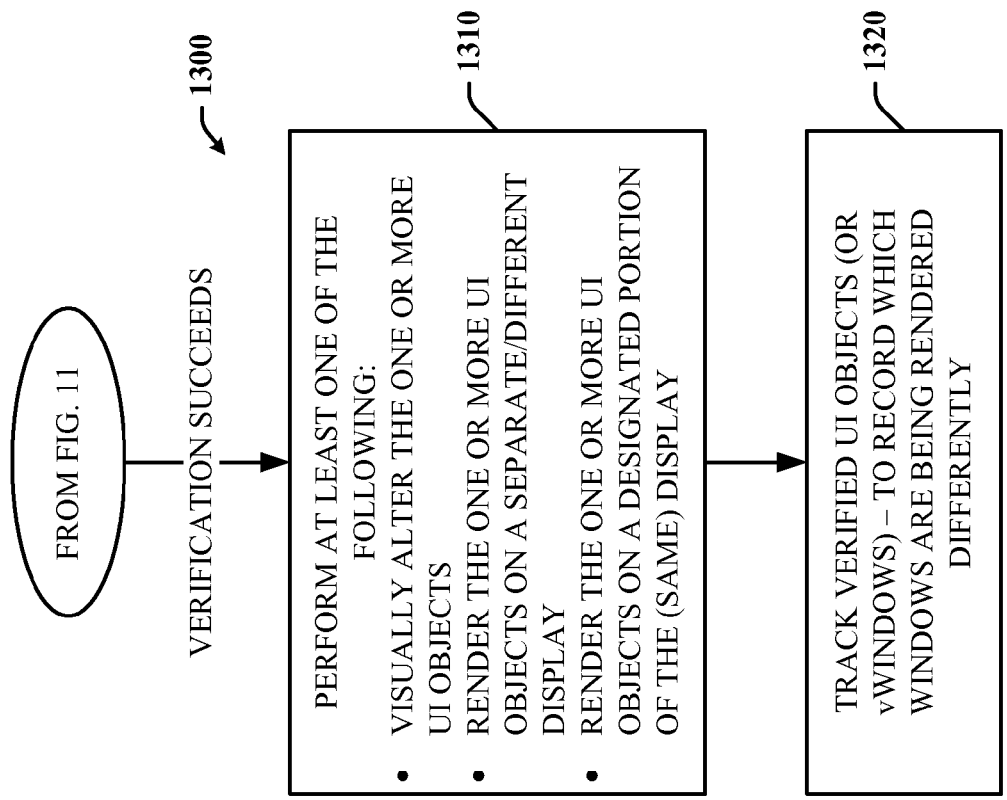
FIG. 13 is a flow diagram illustrating an exemplary method that provides for a course of action when verification succeeds.

However, when verification is successful, at least one of the following can be performed on the verified v Window as indicated in FIG. 13. At 1310, the verified v Window can be visually modified such as by adding color, surface texture or overlay, or some other conspicuous alteration to the v Window to readily distinguish it from other non-verified v Windows. In addition or in the alternative, the verified v Window (or UI objects) can be rendered on a separate display or desktop or on a designated portion of the same display or desktop. At 1320, the verified v Window can be logged into a table or list so that the operating system or central authority can keep track of which windows are being rendered differently.

The visual transform or modification can be effective permanently until the user interacts with the verified v Window or UI objects in some manner or temporarily for only a set period of time. For example, imagine that a color border is added to a window upon verification. This color border can continue to exist until the user either clicks on the window (permanent) or until 10 seconds elapses (temporary).

Figure 14:
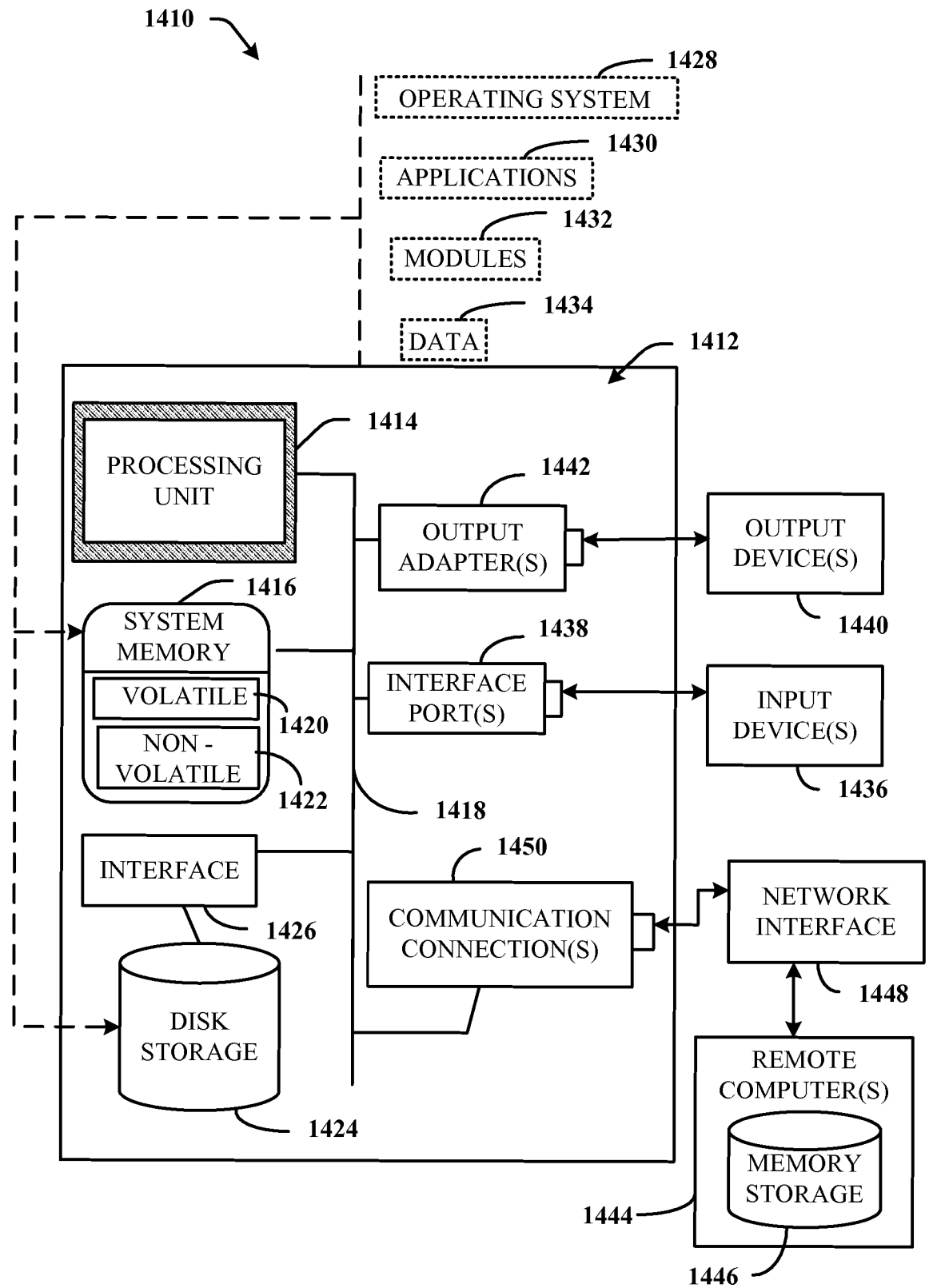
FIG. 14 illustrates an exemplary environment for implementing various aspects of the invention.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a display device;
a detection component configured to detect activation of a verification mode with respect to a collection of objects rendered on a display of the display device;
a verification component configured to, in the verification mode, verify an authenticity of the collection of objects; and
a verification rendering engine configured to re-render at least one object of the collection of objects with a changed appearance if the authenticity of the at least one object is verified, and if the authenticity of the at least one object is not verified, to cause at least one of fading out, increased translucency or rendering on a separate display of the at least one object;

wherein the verification rendering engine is configured to re-render the at least one object at a location on the display designated for rendering verified objects, the location different from an initial location of the at least one object on the display.

2. The system of claim 1, further comprising a rendering component configured to initially render the collection of objects on the display prior to verification of the authenticity of the at least one object.

3. The system of claim 1, further comprising one or more object stores storing one or more objects verified to be authentic, for comparison with the collection of objects.

4. The system of claim 1, wherein the at least one object comprises at least one of a button, text, an image, an icon, a data field, or an advertisement.

5. The system of claim 3, wherein the one or more objects include at least one of digitally signed objects, encrypted objects, watermarked objects or steganographically transformed objects.

6. The system of claim 3, wherein the verification component is configured to verify an identity of the at least one object at least in part by comparing a hash for the object with hash values corresponding to the one or more object stores.

7. The system of claim 1, wherein the changed appearance is configured to elapse after a preset time period.

8. The system of claim 7, wherein the changed appearance comprises at least one of an added color, a changed color, an added border, highlighting, an added or changed surface texture, or a changed location of the at least one object in the display.

9. The system of claim 1, wherein the changed appearance is configured to persist until detection of an input indicating interaction with the display.

10. The system of claim 1, wherein the verification component is configured to verify authenticity of one or more of a plurality of displayed objects based on an input indicating a selection of one or more displayed objects to be verified.

11. A computer-implemented method, comprising:
on a display device, displaying a collection of objects;
applying a verification process to the collection of objects; and
in response to verifying that at least one object of the collection of objects is authentic, re-displaying the at least one object with a modified appearance at a location on the display device designated for displaying verified objects, the location different from an initial location of the at least one object on the display device; and in response to determining that the at least one object is not authentic, causing at least one of fading out, increased translucency or rendering on a separate display device of the at least one object.

12. The method of claim 11, further comprising tracking the at least one object having the modified appearance.

13. The method of claim 11, wherein the re-displaying the at least one object with the modified appearance comprises re-displaying the at least one object with a changed color.

14. The method of claim 11, wherein the re-displaying the at least one object with the modified appearance comprises re-displaying the at least one object with a changed texture.

15. The method of claim 11, further comprising detecting an input to cause a change in state to a verification mode applicable to the verifying.

16. The method of claim 11, further comprising causing the modified appearance to elapse after a period of time.

17. A computer-readable non-transitory storage medium storing instructions to, if executed by a computing device, cause the computing device to perform operations comprising:
detecting an input for activating a verification mode with respect to a collection of rendered objects;
verifying an authenticity of at least one object of the collection of objects; and
re-rendering the at least one object to modify at least one of a color or a texture of the at least one object if the verifying verifies the authenticity of the at least one object, the re-rendering of the at least one object occurring at a location on a display designated for rendering verified objects, the location different from an initial location of the at least one object on the display; and
if the authenticity of the at least one object is not verified, causing at least one of fading out, increased translucency or rendering on a separate display of the at least one object.

18. The computer-readable non-transitory storage medium of claim 17, the verifying the authenticity including comparing the object with one or more trusted objects.

19. The method of claim 11, further comprising:
rendering the collection of objects in a window of the display device, each object of the collection of objects capable of being individually selected for verification;
automatically determining, with respect to at least one object of the collection of objects, a likelihood of at least one of a privacy or a security concern; and
based on the automatically determining, automatically selecting the at least one object of the collection of objects for verification, or automatically suggesting that the at least one object of the collection of objects be selected for verification.

* * * * *